US006807492B2

(12) United States Patent
Oren et al.

(10) Patent No.: US 6,807,492 B2
(45) Date of Patent: Oct. 19, 2004

(54) KNOWLEDGE TREE MEDICAL ENABLEMENT

(75) Inventors: Avraham Oren, Baka Jerusalem (IL); Yehuda Hartman, Rehovot (IL); Yossi Fisher, Jerusalem (IL)

(73) Assignee: Insyst Ltd., Jerusalem (IL)

( * ) Notice: Subject to any disclaimer, the term of this patent is extended or adjusted under 35 U.S.C. 154(b) by 72 days.

(21) Appl. No.: 09/900,491

(22) Filed: Jul. 9, 2001

(65) Prior Publication Data

US 2002/0022931 A1 Feb. 21, 2002

(51) Int. Cl.[7] ............................................. G01N 31/00
(52) U.S. Cl. ............................. 702/23; 703/2; 703/11; 435/6; 435/7.1
(58) Field of Search ............................... 702/23; 703/2, 703/11; 435/6, 7.1

(56) References Cited

U.S. PATENT DOCUMENTS

| | | | |
|---|---|---|---|
| 4,970,658 A | | 11/1990 | Durbin et al. |
| 5,325,466 A | | 6/1994 | Kornacker |
| 5,440,478 A | | 8/1995 | Fisher et al. |
| 5,479,340 A | | 12/1995 | Fox et al. |
| 5,483,468 A | | 1/1996 | Chen et al. |
| 5,546,507 A | | 8/1996 | Staub |
| 5,787,425 A | | 7/1998 | Bigus |
| 5,860,917 A | * | 1/1999 | Comanor et al. ........... 600/300 |
| 5,862,054 A | | 1/1999 | Li |
| 5,875,285 A | | 2/1999 | Chang |
| 6,032,146 A | | 2/2000 | Chadha et al. |
| 6,073,138 A | | 6/2000 | de l'Etraz et al. |
| 6,114,114 A | * | 9/2000 | Seilhamer et al. ............. 435/6 |
| 6,134,555 A | | 10/2000 | Chadha et al. |
| 6,240,329 B1 | | 5/2001 | Sun |
| 6,249,712 B1 | | 6/2001 | Boiquaye |
| 6,263,255 B1 | | 7/2001 | Tan et al. |

FOREIGN PATENT DOCUMENTS

WO      WO 00/00874        1/2000

OTHER PUBLICATIONS

Constructivist Foundations of Modeling—A Kantian Perspective, Marco C. Bettoni, Internat. Journal of Intelligent Systems, vol. 12, No. 8, Aug. 1998, pp 577–595.
Artificial Intelligence and Manufacturing: A Research Planning Report, Leslie D. Interrante Aug. 8, 1997, http://sigmans.cs.umn.edu/sigmanwrk/report96.htm [34 pages].
Final Model Business Case Report for the OSD CALS IWSDB Project, An MVP Joint Venture, Man Tech International Corporation, Dec. 2, 1994, Kidwell et al., http://www2.dcnicn.com/cals/iwsdb/task07/html/a024/Fmodbus1.htm [77 pages].

* cited by examiner

Primary Examiner—Ardin H. Marschel
Assistant Examiner—Carolyn L. Smith
(74) Attorney, Agent, or Firm—G.E. Ehrlich (1995) Ltd.

(57) ABSTRACT

An automated modeler for modeling of an interactive system comprising at least one biological entity and at least one pharmaceutical substance, the system comprising, a representation of states of said system, a knowledge tree builder, associated with said representation for allowing users to define the states, expected relationships between said states and independent inputs to the states, and a data miner associated with said representation to operate on data taken from said system to apply said data to said states in accordance with said defined relationships and inputs, thereby to apply numerical values to said relationships and said inputs, thereby to model said interactions.

1 Claim, 7 Drawing Sheets

KNOWLEDGE TREE MEDICAL ENABLEMENT

FIELD OF THE INVENTION

The present invention relates to knowledge tree enablement within the medical field and more particularly but not exclusively to knowledge tree enablement in the field of studying side effects of drugs, with particular reference to liver toxicity.

BACKGROUND OF THE INVENTION

Pharmaceuticals are required to undergo a demanding set of clinical trials in order to prove both that they work and that they work safely, that is without untoward side effects. Also, different pharmaceuticals interact with each other so that certain drug combinations cannot safely be prescribed. The interactions between drugs are not widely understood and there is a tendency not to prescribe in any case of doubt.

Clinical trials generally involve large numbers of patients and by their nature produce large amounts of data. The results of the trail are generally assessed and conclusions reached as to the safety and efficacy of the drug.

However, analysis of large amounts of data is difficult. Each patient or volunteer participating in the trial has a medical history and it is difficult to spot patterns in the data that relate, for example, to a particular item of medical history. Thus it is also known to use automatic methods of data mining, in which computers are used to find all the possible relationships within a data set. Such an approach is unhelpful in the case of clinical trials since many trivial relationships are found. Furthermore an enormous amount of processing power is required to run such data mining, and a large amount of human analysis is required afterwards to remove all of the trivial relationships and to concentrate on the important data

SUMMARY OF THE INVENTION

According to a first aspect of the present invention there is thus an automated modeler to modeling of an interactive system comprising at least one biological entity and at least one pharmaceutical substance, the system comprising:
  a representation of states of the system,
  an input, associated with the representation for allowing users to define at least one of, the states, expected relationships between the states and independent inputs to the states,
  a data miner associated with the representation to operate on data taken from the system to apply the data to the states in accordance with the defined relationships and inputs, thereby to apply numerical values to the relationships and the inputs, thereby to model the interactions.

Preferably, the states include beneficial actions of the pharmaceutical substance.

Additionally or alternatively, the states include harmful actions of the pharmaceutical substance.

Preferably, the model is usable to predict harmful interactions of the pharmaceutical substance within the system.

Preferably, the interactions are between at least one biological entity and a plurality of pharmaceutical substances.

Preferably, the interactions are between at least one pharmaceutical entity and a plurality of biological entities.

Preferably, the data is clinical trial data.

Preferably the model is usable to direct a clinical trial.

Preferably, the model is usable to direct drug administration to a patient.

Preferably the model is further operable to use a second data set to calibrate the model, and a third data set to test the model.

According to a second aspect of the present invention there is provided an automated system for processing effects on liver toxicity of at least one pharmaceutical substance in application to a biological entity, the system comprising:
  a representation of states of the application,
  an input, associated with the representation for allowing users to define expected relationships between the states, and independent inputs to the states,
  a data miner associated with the representation to operate on data taken from the application to apply the data in accordance with the defined relationships and inputs, thereby to apply numerical values to the interactions and the inputs, to model the application.

Preferably, the application comprises a plurality of pharmaceutical substances.

According to a third aspect of the present invention there is provided a system for producing likely liver toxicity as a side effect of application of a pharmaceutical substance, the system comprising:
  an input device for obtaining blood levels of ALT and AST respectively,
  a comparator, associated with the input device for comparing the respective levels of ALT and AST to produce a ratio of the levels, and
  a predictor associated both with the input device and the comparator, for predicting, from the levels and the ratio therebetween, a likelihood of development of liver toxicity.

Preferably, the predictor is set to conclude from low ALT and AST levels and a ratio close to 1, that a likelihood of development of liver toxicity is low.

Preferably, the predictor is set to conclude from high ALT and AST levels, that a likelihood of liver toxicity is relatively high.

Preferably, the predictor is set to conclude from a ratio not close to 1, that a likelihood of liver toxicity is relatively high.

Preferably, the predictor is set to conclude from a ratio close to 1, that a likelihood of liver toxicity is relatively low.

A preferred embodiment further comprises a thresholder for setting a threshold likelihood, above which application of the pharmaceutical substance is to be discontinued.

According to a fourth aspect of the present invention there is provided a method for modeling an interaction between at least one biological system and at least one pharmaceutical substance the method comprising:
  building a state diagram of the interaction,
  entering at least one of inputs to the states and interactions between the states,
  defining at least one output from at least one of the states,
  obtaining empirical data regarding the interaction,
  carrying out data mining on the empirical data to assign at least one of values to the relationships and functions to the states, thereby to obtain a quantitative model of the interaction.

Preferably, the method comprises
  randomly dividing the empirical data set into at least two data sets,
  performing the data mining using only one of the sets, and
  testing the model using a remaining one of the sets to ensure that the data has not been overfitted.

BRIEF DESCRIPTION OF THE DRAWINGS

For a better understanding of the invention and to show how the same may be carried into effect, reference will now be made, purely by way of example, to the accompanying drawings, in which.

DESCRIPTION OF THE PREFERRED EMBODIMENTS

Figure 1:
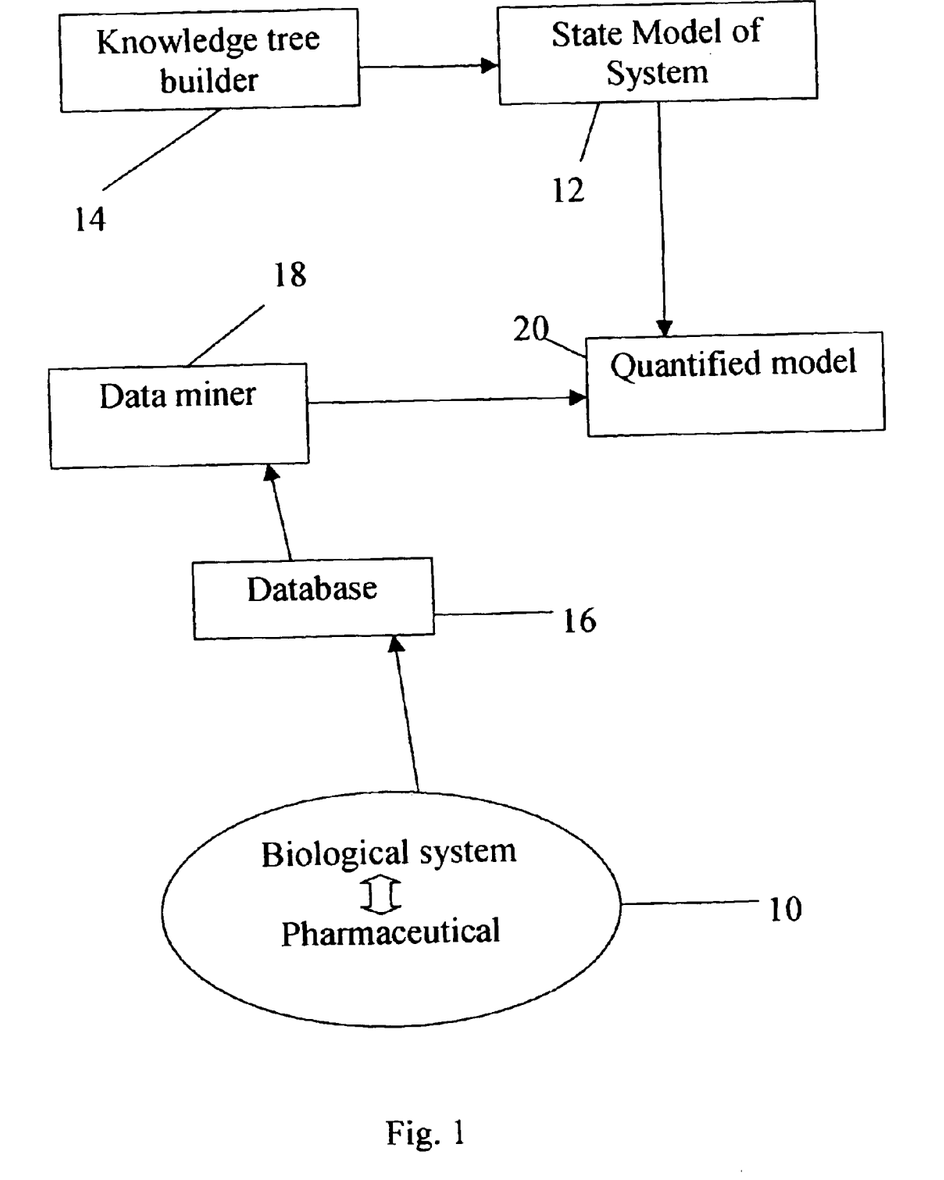
FIG. 1 is a simplified diagram showing a modeling apparatus according to a first embodiment of the present invention.

Reference is now made to FIG. 1, which is a simplified schematic diagram of an automated modeler for modeling of an interactive system. An interactive system 10 comprises a biological entity and a pharmaceutical substance Generally, it is of great interest to understand the interactions within the system, so as to allow for safe use of the pharmaceutical substance. The modeler is initially supplied with a state model 12 of the system 10, generally as a logical entity within a computer. The state model may be specific to the system being tested or it may be generalized for a certain type of system. Generally, the number of states is small at least initially. As the problem is considered further it is generally broken down into smaller and smaller units. Thus the state model has a tendency to grow in size and the number of states increases. Initially, at an early stage of understanding it is often easier to work with a small number of nodes each having a large number of inputs and outputs, but as the model is refined, a larger number of nodes each reflect more direct causal relationships between a smaller number of inputs and outputs. The nodes at this more advance stage are easier to analyze in terms of data mining and the system tends to produce more accurate results.

Each node is preferably assigned a function that relates between inputs and outputs. At the start a presumed function may be used. For example a node may be defined for determining the quantity of bilirubin in the blood. There are two types of bilirubin, direct bilirubin and indirect bilirubin, each of which is measured separately. Each of the two measurements are set as inputs to the node and a summing function is set within the node to give an output indicative of the total amount of bilirubin.

Initially the function is either guessed or is fitted from the test data during the data mining procedure, a will be discussed in more detail below. The function is then refined using empirical data in an operation of function fitting. The function is preferably refined with empirical data to steadily reduce the output variance. As will be discussed in more detail below, overfitting of the function is preferably avoided.

The state model 12 comprises a representation of states of said system, but preferably does not initially include relationships therebetween, model inputs or quantities.

The modeler further comprises knowledge tree building 14, connected to the representation or sate model 12, for allowing users to define states in the model and expected relationships between the states and independent inputs to the states. The idea is that experts, persons expected to know about the system, are selected and asked to define relationships between the states, and inputs to the states, that they believe to be significant. Again, at this stage, no attempt is made to quantify and of the relationships. The experts are simply asked to define relationships that they believe, in the light of their experience, to exist.

In the present case, suitable experts may include pharmaceutical researchers familiar with trials of similar drugs, and specialist medical practitioners familiar with the condition that the pharmaceutical substance currently under test is intended to treat. It could include patients involved in the trial if deemed appropriate. Generally it is regarded as advantageous to apply as wide a range of experience to the input stage of the modeling as possible.

The modeler preferably has a database 16 of quantified information regarding the system to be modeled. Traditional modeling systems based on quantities of data have attempted to find every possible relationship within the data and have tended to produce unwieldy models and require processing resources out of all proportion to the data available and rising exponentially with increases in the size of the database.

A data miner 18 preferably operates in association with the representation and with the database to apply values to the relationships. That is to say the model, with its expert-defined relationships, is used as a guide to the data mining process. The data mining process is thereby restricted to the study of relationships regarded by experts as important or relevant and in effect, a dimension reduction is achieved in the modeling process. The result is a quantified model encompassing all the states and all the interactions therebetween that have been previously decided to be important. A further reduction in the model may then be carried out by removing relationships whose quantities are found to below a threshold value. Alternatively or additionally, relationships or inputs whose effect on an output is found to be negligible, may be removed.

In a further stage, if the model thus formed is found to be inadequate, the experts may be consulted again to find out if a relationship is missing. The quantification process may then be repeated with the new relationship. That is to say, when checking the data, the variance in the outputs is very large. In such a case a new relationship is preferably added to the model.

Returning to the question of function fitting, in theory it is possible to produce a function of very high order which covers exactly every single data point in the input. Such a function however is viewed as of limited predictive ability because it includes all the noise in the original data. Using functions of such high order is considered as overfitting the function. In order to prevent overfitting it is possible to randomly divide the data into three groups and to use the first group for initial quantization of the model, the second group for calibration of the model and the third group simply for testing the model. The third group is not used to refine the model but simply to ensure that the variance around the third group is the same as with the other groups, thereby determining that overfitting of the data has not occurred.

The system being modeled is generally the interaction between one or more biological entities and one or more pharmaceutical substances. A particular beneficial interaction may be the subject of the study or a particular harmful interaction, or the model may simply seek to model the interactions as a whole. Once the model has been created it may be used to predict possible interactions, including side effects, when administered to a patient. For example the model may contain a relationship between age and a particular side effect of the drug. The prescribing physician can therefore use the model to note that the danger of the side effect is enhanced and guide both himself and the patient as to particular effects to watch out for in particular cases. The physician is also provided with reliable information on which to base a decision that a particular drug is too dangerous to prescribe for a given patient or that, contrary to previous belief, a certain drug is perfectly safe to give to a particular patient. The latter case may result, for example, from the ability of the model to relate a particular side effect to age or any other patient variable, which the physician is then able to see is not applicable to his current patient.

The system may typically be used in a study of a single pharmaceutical substance used in numerous patients, that is to say is typical use its in modeling data from various stages of clinical trials. Subsequently the model may be used as a predictor in the use of the substance on individual patients. Of course the result of the treatment of the individual patient may then be added to the database for subsequent refinements of the model.

It is noted however, that the system may also be used for studying the use of a combination of drugs on patients. Generally, in such a case, interactions are poorly understood, and prescribing rules for drug interactions generally assume the worst. That is to say, if there is a known serious side effect of the particular drug combination then the physician will usually be led to avoid prescribing the combination in all circumstances. A predictive model that includes interactions between drugs may therefore serve as a means of allowing the prescription of a wider range of drug combinations.

The predictive power of the model may be used to direct a clinical trial. For example data gathered up to a certain point may reveal that the drug is harmful to patients over a certain age, and thus the trial may be stopped in respect of patients over that age but continued in respect of everyone else. Currently the trials are most likely to be stopped altogether.

A particularly preferred embodiment of the present invention uses a first set of data to build the model and then runs the model on a second set of data to calibrate the model. Preferably a third set of data if available, may be used to test the calibrated model.

Figure 2:
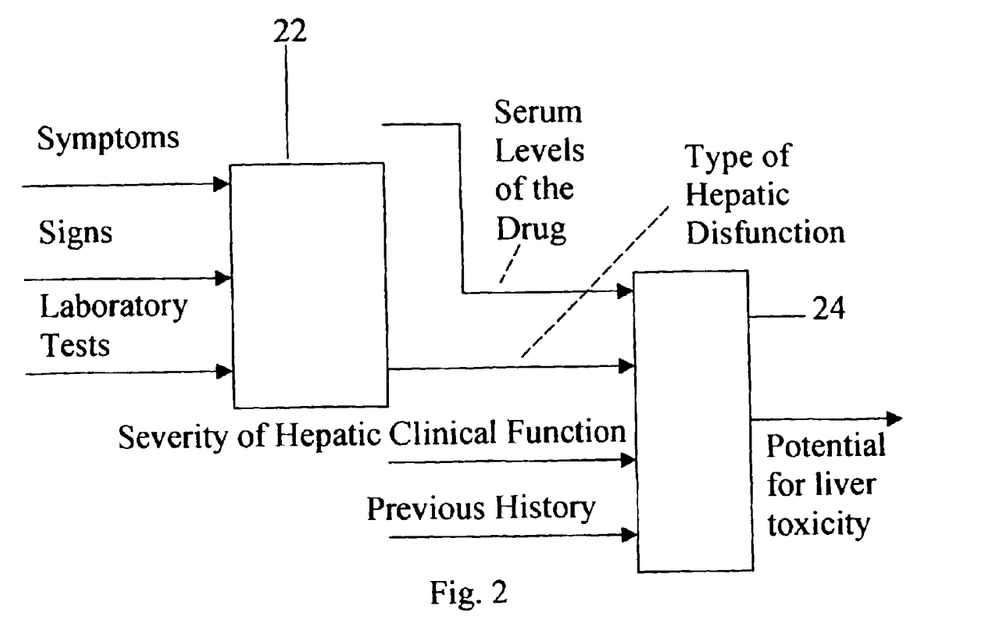
FIG. 2 is a qualitative model for studying liver toxicity for use in the embodiment of FIG. 1.

Reference is now made to FIG. 2, which is a simplified diagram of a qualitative model for measuring liver toxicity effects of a drug. The model is the version after expert input but before data mining. The model contains two nodes, a first node 22 takes symptoms, signs and laboratory test results as input and produces an output of "type of hepatic dysfunction". A second node 24 receives the "type of hepatic dysfunction" as an input, along with previous patient history, severity of hepatic clinical function and serum levels of the drug, and produces an output of "potential for liver toxicity".

The model of FIG. 2 is from the point of view of the individual patient, and indicates a way of fixing the thought processes of the expert. The expert analyzes the patient clinical profile, which includes symptoms (subjective description of the patient's feelings) signs (objective marks on the patient's body) and laboratory test results, as described above. Using the patient's clinical profile the physician would normally decide on the diagnosis. More specifically, the physician may decide whether the patient has any hepatic dysfunction and refine the diagnosis concerning the liver The above process is embodied in the knowledge tree of FIG. 2.

The model as described above is sufficient to guide a data miner utility to create a formula for node 22.

Similarly node 24 includes four inputs as shown, serum levels of the drug, type of hepatic dysfunction, severity and previous history. The output of box 24 is the potential for liver toxicity of the specific drug. Following a similar analysis using a data mining utility the pharmaceutical company or prescribing practitioner is supplied with considerable information regarding the safety or efficacy of the drug.

Beyond relationships within individual nodes, the model also supplies information about relationships between nodes. Thus the output of first node 22 can be used as an input to second node 24. The relationship between the two nodes is that of cause and effect, which is to say that the output of the first node is one of the causes or inputs of the second node. It is pointed out that a cause and effect relationship can be examined in two ways, given a cause I can predict an effect, but additionally, given an effect I can use the tree to make assumptions about the cause. In the present case, moving from a final output of potential for liver toxicity one can determine the clinical finding in the patient that warned of the toxicity.

Figure 3:
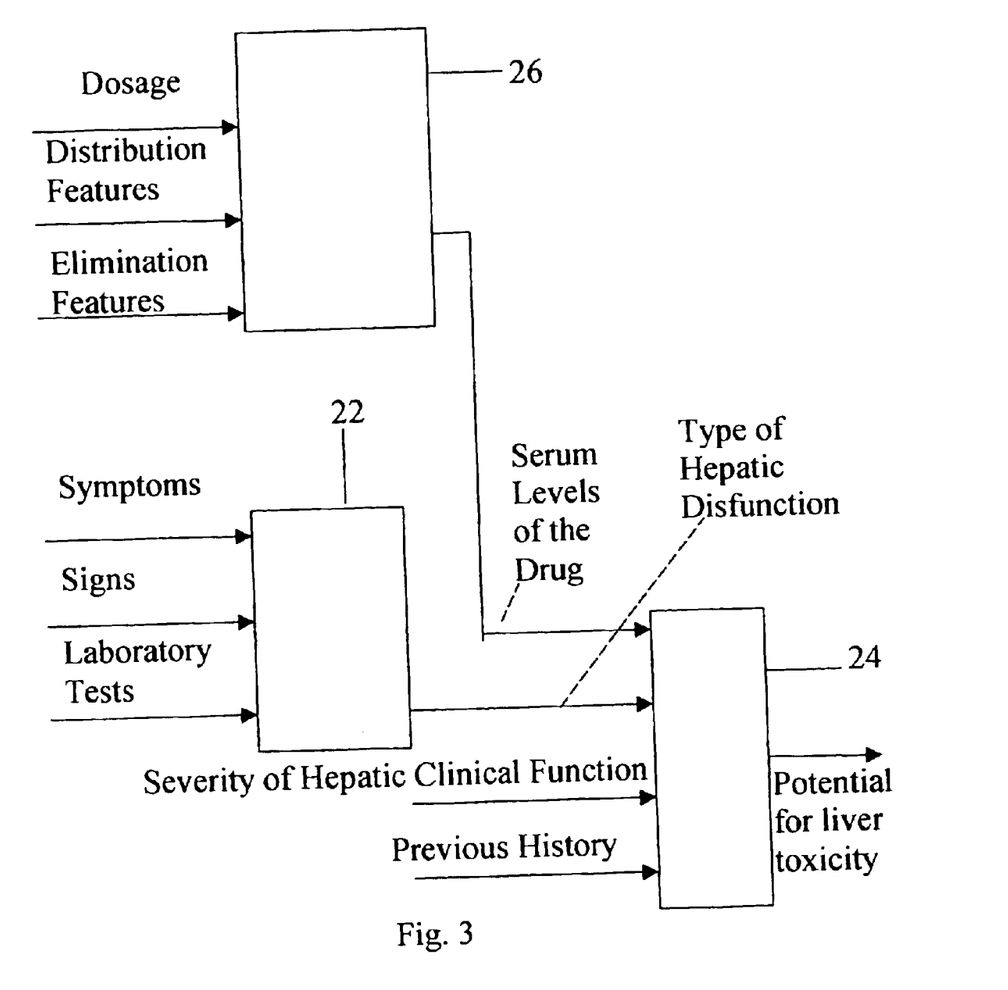
FIG. 3 is an alternative qualitative model for studying liver toxicity for use in the embodiment of FIG. 1.

Reference is now made to FIG. 3, which is a simplified diagram of a variation of the model of FIG. 2. Parts that are the same as those in previous figures are given the same reference numerals and are not described again except as necessary for an understanding of the present embodiment. In the model of FIG. 3, a new node is introduced, of which "serum levels of the drug" is an output. Three inputs of dosage, distribution features and elimination features are defined as influences on the serum level. A progression is shown between the models of FIGS. 2 and 3 which progression is typical of how a model progresses as experts continue to deliberate over it.

Figure 4:
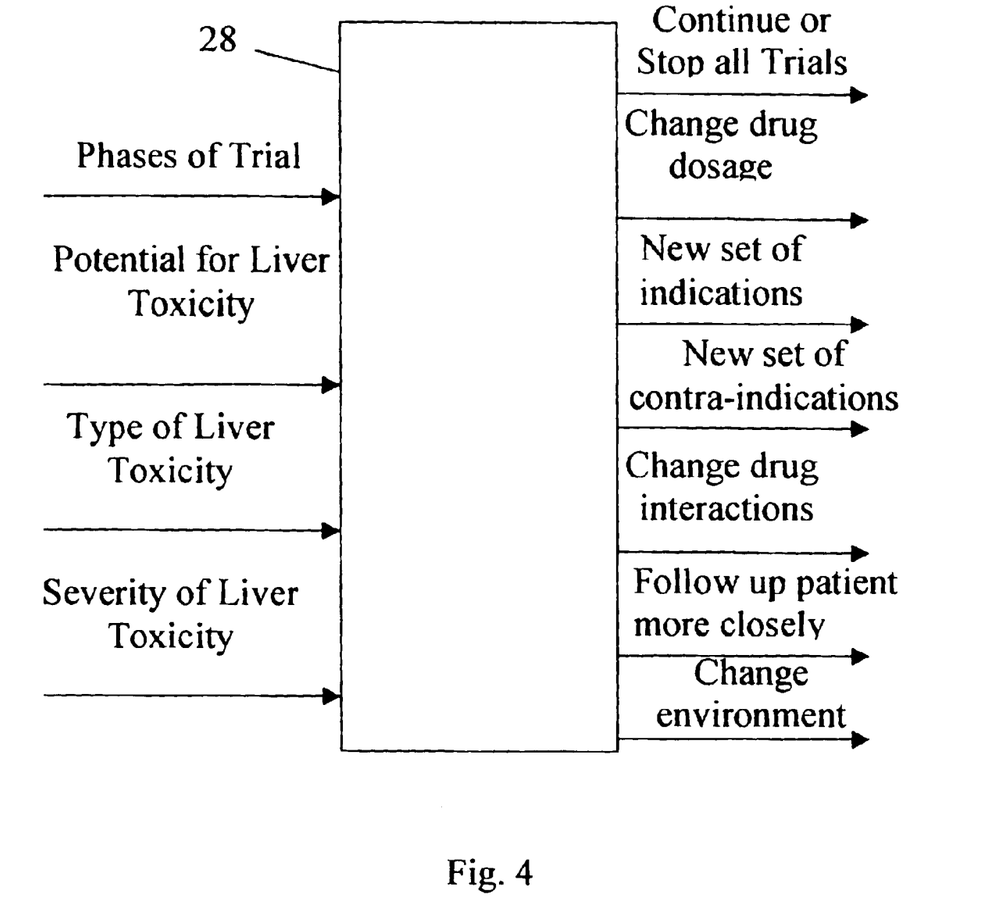
FIG. 4 is a further node for addition to either of the models of FIG. 3 or FIG. 4 for extending the model to control of a clinical trial.

Reference is now made to FIG. 4, which is a simplified diagram of an extension that may be made to either of the models of FIG. 2 or FIG. 3, to allow the model to be used in the management of a clinical trial. The model includes a single node 28 which receives as an input the output "potential for liver toxicity" of the models of FIG. 2 or FIG. 3. As additional inputs the node 28 is told about which phase of the trial is involved, the type of liver toxicity, and the severity of the liver toxicity. The inputs are for the clinical trial as a whole.

A series of outputs are defined as shown in the figure for managing the trail based on the information gleaned, continue or stop the trial, change drug dosage, new set of indications, new set of contraindications, change drug interactions, follow up patient more closely, and change environment.

Figure 5A:
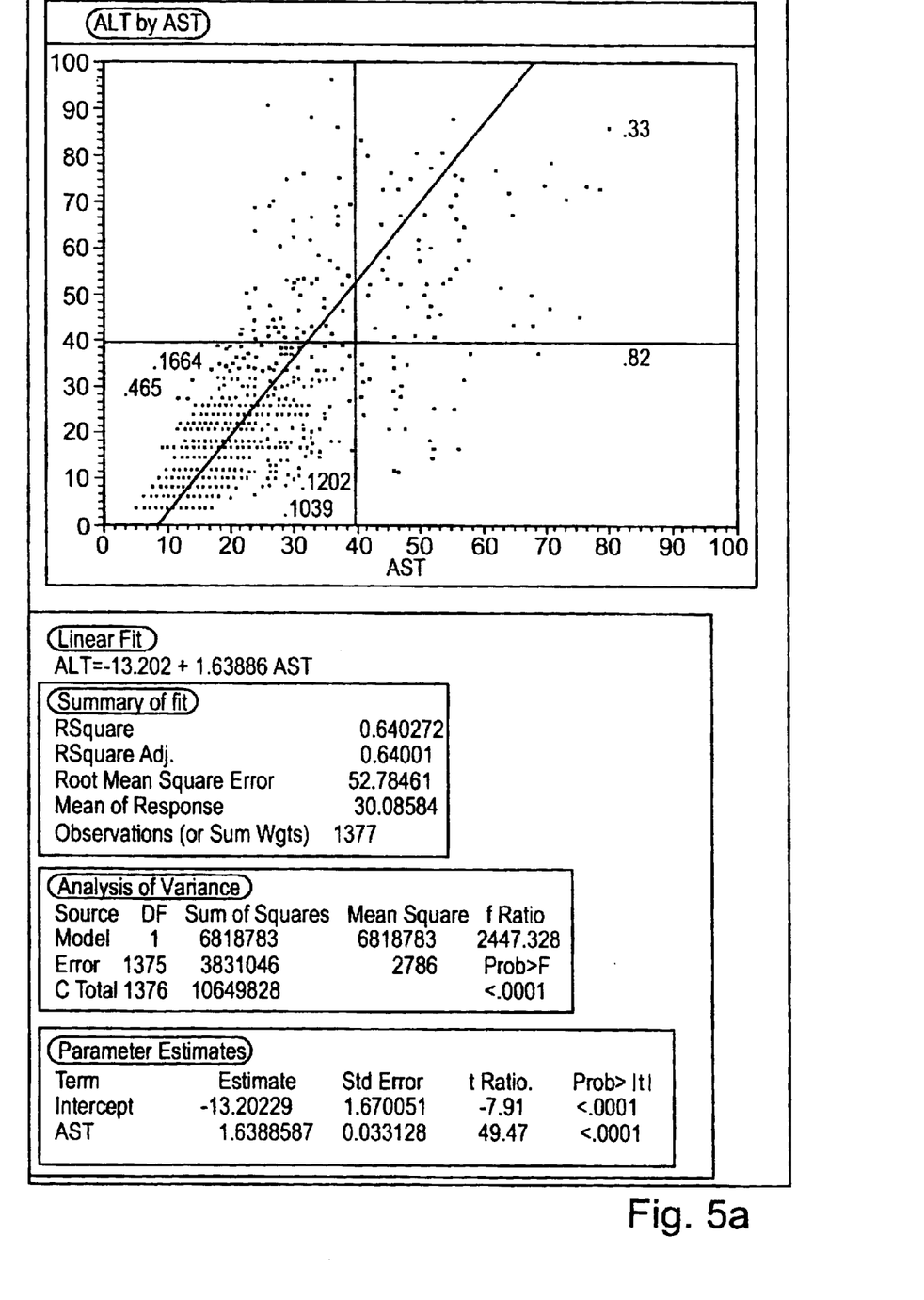
FIG. 5A is a graph showing the relationship between ALT and AST liver enzymes in the blood.

Reference is now made to FIG. 5A, which is a graph showing a relationship that was discovered using the system of the previous embodiments and which can be useful to studying the state of the liver. In FIG. 5 the relationship is shown between two liver enzymes, ALT and AST. (Generally, levels of both ALT and AST are relatively low in the bloodstream as the enzymes are retained in the liver. In the event of trauma within the liver, and especially in the event of larger than normal scale death of liver cells, some of the enzyme escapes into the blood. Thus, the presence of noticeable levels of either of the above enzymes has been used in the past as an indicator of liver toxicity. Indeed in FIG. 5, the vast majority of points plotted are close to the origin of the graph. In applying the above embodiments to the liver system it was hypothesized that a linear relationship existed between the two enzymes. In any case a certain linearity can be seen in the graph.

The model found that there is indeed a linear relationship between the two substances, but that the linearity is stronger in the case of healthy patients than in patients already known to be suffering from liver dysfunction. Thus, the potential for liver dysfunction may be predicted by monitoring, not only the overall levels of AST and ALT, but also the extent of the linearity in the relationship therebetween.

For example a point numbered 33 located in the top right hand corner of the graph has high levels of both enzymes and would traditionally have been indicated as a sign of illness. Nevertheless the relationship is here shown to be linear, indicating that the illness is not serious. By contrast a point numbered 82 in the lower right part of the graph is very non-linear, indicating serious liver dysfunction.

The four numbered points 1202, 1039, 485 and 1664, around the periphery of the lower left region of the graph would traditionally have been regarded as being healthy on the grounds that neither enzyme is outside the limit. However linearity is clearly low and the present embodiment preferably signals the presence of liver disorder.

Figure 5B:
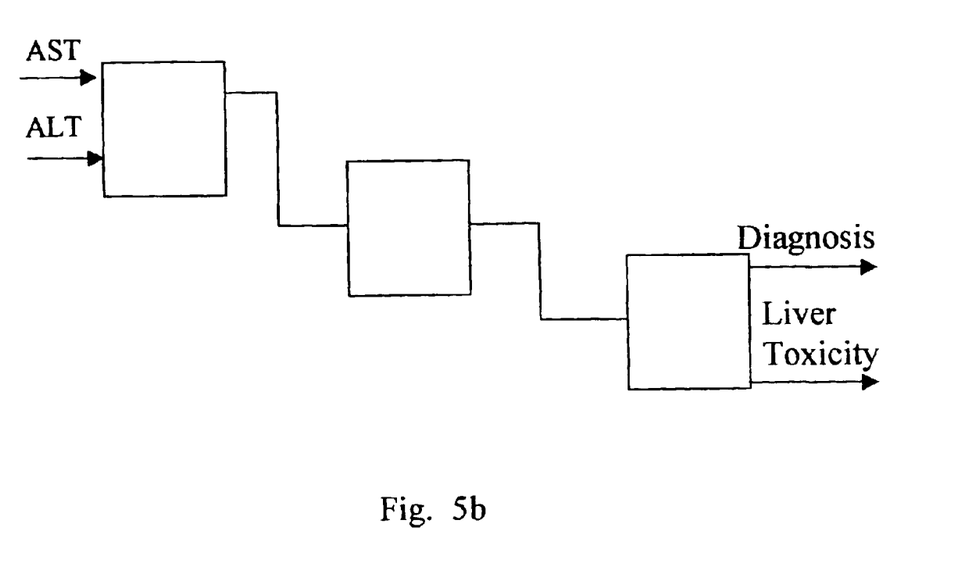
FIG. 5B is a diagram of a knowledge tree that incorporates a linear relationship between the ALT and AST enzymes as inputs leading to a diagnosis.

The above prediction may be incorporated into a model as described with respect to FIG. 4 for conducting a clinical trial. It may also be incorporated into an individual patient model of the kind shown in FIGS. 2 and 3. The model may be connected directly to an input device for reading in AST and ALT levels. Once the model has been quantized it will generally include a node whose outputs are defined so that they effectively compare the levels of the two drugs. If departure from linearity is detected then a diagnosis of liver disorder may be given. A knowledge tree which includes the enzyme levels as inputs and gives a diagnosis as an output is shown in FIG. 5B. Generally, the quantifying stage may find new relationships between variables or attach greater or lesser importance to previously known or suspected relationships, which can now be incorporated into new models.

It is also possible to build a dedicated device for applying to a patient to obtain an indication of liver toxicity. The dedicated device preferably comprises an input device for measuring AST and ALT levels and a processor includes comparison circuitry for producing a ratio. The processor preferably also includes analysis, or predictor, functionality which uses either or both of the absolute values and the ratio between to decide on the potential for liver toxicity. For example the predictor may be set to conclude from low ALT and AST levels and departure from the linear relationship, that a likelihood of development of liver toxicity is low. Likewise the predictor may be set to conclude from high ALT and AST levels, that a likelihood of liver toxicity is relatively high. Again, the predictor may be set to conclude from departure from linearity, without reference to absolute levels, that a likelihood of liver toxicity is relatively high. Likewise, the predictor may be set to conclude from a ratio close to linearity, without reference to absolute levels, that a likelihood of liver toxicity is relatively low. In a preferred embodiment, a thresholder may be included in the predictor for setting a threshold likelihood, above which application of the pharmaceutical substance is to be discontinued as being too dangerous. The threshold is preferably altered for different substances and for different ailments. For example a drug being used in life-threatening ailment is preferably assigned a high threshold for discontinuity whereas a drug that is being used for a chronic but low level condition may be given a lower threshold for discontinuity.

Figure 6:
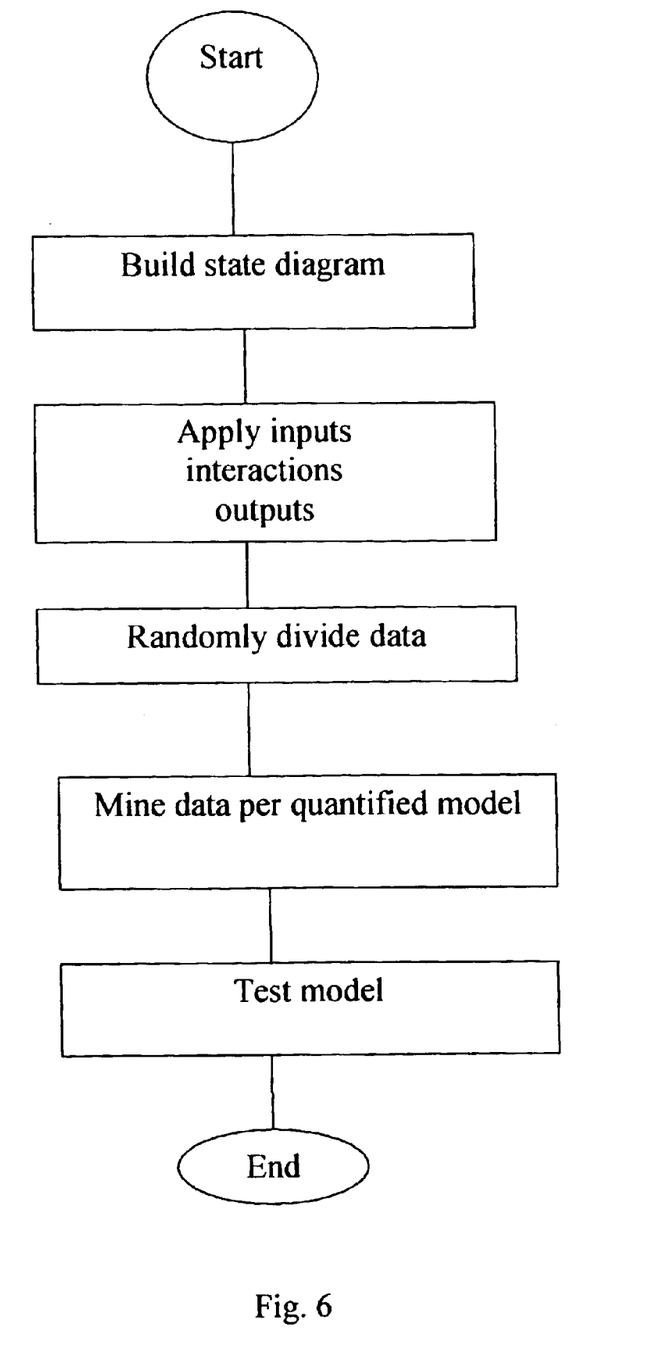
FIG. 6 is a simplified flow chart showing a method of modeling an interaction between a biological entity and a pharmaceutical substance according to an embodiment of the present invention.

Reference is now made to FIG. 6, which is a simplified flow chart describing a method of modeling an interaction between a pharmaceutical substance and a biological system according to a preferred embodiment of the present invention.

In FIG. 6 a first stage of arranging a state diagram of the interaction to be modeled is carried out. Then a stage of adding interactions between the states and inputs to the states is carried out. At least one output is also preferably defined. The above stages are preferably carried out using a knowledge tree builder as described above. A data set, preferably including empirical data is taken to feed a data mining procedure which studies the data for the interactions indicated in the model. A quantified model of the interaction is thereby attained. Standard experimental procedure provides that the data is divided into three, preferably at random. One of the data sets is then used for data mining, one of the data sets is used for calibration and one of the data sets is used for testing the data to ensure that overfitting of the data has not occurred.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A system for predicting likely liver toxicity as a side effect of application of a pharmaceutical substance, the system comprising:

an input device for obtaining blood levels of ALT and AST respectively, a comparator, associated with said input device for comparing said respective levels of ALT (alanine aminotranferase) and AST (aspartate aminotransferase) to produce a ratio of said levels, a predictor associated both with said input device and said comparator, and including a statistical model, for predicting, from application of said levels and said ratio therebetween to said statistical model, a likelihood of development of liver toxicity, said predictor set to conclude from low ALT and AST levels and a ratio close to 1, that a likelihood of development of liver toxicity is low, and a thresholder for setting a threshold likelihood, above which application of said pharmaceutical substance is to be discontinued.

* * * * *